United States Patent
Iwahashi et al.

(10) Patent No.: US 11,036,878 B2
(45) Date of Patent: *Jun. 15, 2021

(54) CONTROLLING ACCESS TO DATA IN A DATABASE

(71) Applicant: International Business Machines Corporation, Armonk, NY (US)

(72) Inventors: Tomohiro Iwahashi, Bunkyo (JP); Atsushi Noguchi, Chiba (JP); Naoko Nishiura, Chiba (JP); Kanako Tsuchida, Koto (JP)

(73) Assignee: International Business Machines Corporation, Armonk, NY (US)

(*) Notice: Subject to any disclaimer, the term of this patent is extended or adjusted under 35 U.S.C. 154(b) by 123 days.

This patent is subject to a terminal disclaimer.

(21) Appl. No.: 16/402,323

(22) Filed: May 3, 2019

(65) Prior Publication Data
US 2019/0318116 A1  Oct. 17, 2019

Related U.S. Application Data

(63) Continuation of application No. 14/827,491, filed on Aug. 17, 2015, now Pat. No. 10,339,329.

(30) Foreign Application Priority Data

Sep. 25, 2014 (JP) .................. 2014195746

(51) Int. Cl.
*G06F 16/25* (2019.01)
*G06F 21/62* (2013.01)

(52) U.S. Cl.
CPC .......... *G06F 21/6218* (2013.01); *G06F 16/25* (2019.01); *G06F 21/6227* (2013.01)

(58) Field of Classification Search
None
See application file for complete search history.

(56) References Cited

U.S. PATENT DOCUMENTS

| | | | |
|---|---|---|---|
| 7,725,501 B1 * | 5/2010 | Stillman | G06F 16/284 707/805 |
| 9,323,804 B2 | 4/2016 | Weissman | |
| 10,339,329 B2 * | 7/2019 | Iwahashi | G06F 21/6218 |
| 2002/0138582 A1 | 9/2002 | Chandra | |
| 2005/0289524 A1 | 12/2005 | McGinnes | |
| 2010/0180029 A1 * | 7/2010 | Fourman | G16H 10/60 709/225 |
| 2014/0012922 A1 | 1/2014 | Wu | |

(Continued)

FOREIGN PATENT DOCUMENTS

| | | | |
|---|---|---|---|
| JP | 07049936 A | 2/1995 | |
| JP | 07253894 A | 10/1995 | |

(Continued)

*Primary Examiner* — Narayanswamy Subramanian
(74) *Attorney, Agent, or Firm* — Jay Wahlquist

(57) ABSTRACT

A method and associated apparatus/system for controlling access to data in a database. A first login by a first user is accepted. A second login by the first user under the name of a second user is accepted. Third data is referred, based on first data of the database accessible from the first user and second data of the database accessible from the second user, upon request to refer to the database under the name of the first user or the second user after the first login and the second login are accepted.

20 Claims, 13 Drawing Sheets

(56) References Cited

U.S. PATENT DOCUMENTS

| | | |
|---|---|---|
| 2014/0073357 A1 | 3/2014 | Johnson |
| 2014/0180711 A1 | 6/2014 | Kamen |
| 2014/0222780 A1 | 8/2014 | Wu |
| 2016/0048936 A1 | 2/2016 | Perkowski |
| 2016/0092692 A1 | 3/2016 | Iwahashi |
| 2016/0314313 A1* | 10/2016 | Weissman ........... G06F 16/2365 |
| 2017/0032136 A1 | 2/2017 | Gangadharappa |
| 2018/0060366 A1 | 3/2018 | Kumar |

FOREIGN PATENT DOCUMENTS

| | | |
|---|---|---|
| JP | 09219750 A | 8/1997 |
| JP | 10228402 A | 8/1998 |
| JP | 2000132445 A | 5/2000 |
| JP | 2001022749 A | 1/2001 |
| JP | 2003006194 A | 1/2003 |
| JP | 2005129051 A | 5/2005 |
| JP | 2005157894 A | 6/2005 |
| JP | 2006260547 A | 9/2006 |
| JP | 2011510397 A | 3/2011 |
| JP | 2011141814 A | 7/2011 |
| JP | 2013030022 A | 2/2013 |
| JP | 2013065125 A | 4/2013 |

* cited by examiner

XYZ SECURITIES COMPANY | TOM: CURRENTLY LOGGING IN

ADDITIONAL LOGIN OF FAMILY MEMBER

ADDITIONAL LOGIN OF FAMILY MEMBER

INPUT ID OF A CUSTOMER WHOSE PORTFOLIO IS TO BE VIEWED TOGETHER WITH TOM'S PORTFOLIO.

USER ID: mary
PASSWORD: *******

[LOGIN]

*NOTES
IN ORDER TO VIEW ONLY ONE DIFFERENT USER'S PORTFOLIO, LOG OUT ONCE AND LOG IN AGAIN WITH THE DIFFERENT USER'S ID/PASSWORD.

[LOGOUT]

| TABLE ID | USER ID | AUTHORITY ID | REFERENCE ENABLED/DISABLED | UPDATE ENABLED/DISABLED |
|---|---|---|---|---|
| T1 | a | P1 | Y | Y |
| T1 | b | P2 | Y | Y |
| T1 | ab | P12 | Y | N |

FIG. 7A (b)

| AUTHORITY ID | ACCESSIBILITY RANGE |
|---|---|
| P1 | row#1-4 |
| P2 | row#5-7 |
| P12 | row#1-7 |

FIG. 7B (c)

| USER ID | "CONNECTED" FLAG | ALL-USERS FLAG |
|---|---|---|
| a | 0 | 0 |
| b | 0 | 0 |
| ab | 1 | 1 |

FIG. 7C (a)

| TABLE ID | USER ID | AUTHORITY ID | REFERENCE ENABLED/DISABLED | UPDATE ENABLED/DISABLED |
|---|---|---|---|---|
| T1 | a | P1 | Y | Y |
| T1 | b | P2 | Y | Y |
| T1 | c | P3 | Y | Y |
| T1 | ab | P12 | Y | N |
| T1 | abc | P123 | Y | N |

FIG. 11A (b)

| AUTHORITY ID | ACCESSIBILITY RANGE |
|---|---|
| P1 | row#1-4 |
| P2 | row#5-7 |
| P3 | row#8-10 |
| P12 | row#1-7 |
| P123 | row#1-10 |

FIG. 11B (c)

| USER ID | "CONNECTED" FLAG | ALL-USERS FLAG |
|---|---|---|
| a | 0 | 0 |
| b | 0 | 0 |
| c | 0 | 0 |
| ab | 0 | 0 |
| abc | 1 | 1 |

FIG. 11C

CONTROLLING ACCESS TO DATA IN A DATABASE

TECHNICAL FIELD

The present invention relates to a method and associated system or apparatus for controlling access to database.

BACKGROUND

An existing web system assumes that one user logs in from one web browser. Recently, however, with increase in the size of a projector and a liquid crystal monitor and improvement of screen sharing tools and the like, a use form in which multiple users share one web screen and perform reference and operations is also practiced. For example, in an environment (e.g., a web system, a general computer system, etc.) in which an external USB keyboard or a mouse is connected to a notebook PC connected to a projector, such a use form can be provided.

SUMMARY

The present invention provides a method and associated apparatus/system for controlling access to data in a database. A first login by a first user is accepted. A second login by the first user under the name of a second user is accepted. Third data is referred, based on first data of the database accessible from the first user and second data of the database accessible from the second user, upon request to refer to the database under the name of the first user or the second user after the first login and the second login are accepted.

The present invention provides a method and associated apparatus/system for accessing data in a database table. A processor of a first computer receives a login of a first user to the first computer using a first user ID. The processor receives a login of a second user, by the first user, to the first computer using a second user ID that differs from the first user ID. The processor sends, to a second computer having access to a database table while the first user and the second user are simultaneously logged into the first computer, a search request for first data and second data, from the table, that the first user and the second user is authorized to access, respectively. After the search request is sent, the processor receives, from the second computer, the requested first and second data in the table. The received first and second data comprises individual data and family data. The individual data comprises a first set of rows of the table that the first user is authorized to access and a second set of rows of the table that the second user is authorized to access. The family data is (i) a sum set consisting of a combination of the first set of rows and the second set of rows or (ii) a product set consisting of a combination of the rows that both the first set of rows and the second set of rows comprise. The processor displays, in a user interface on a display screen of the first computer, the individual data or the family data, in response to the individual data or the family data having been selected in the user interface by the first user or the second user.

BRIEF DESCRIPTION OF THE DRAWINGS

FIG. 3 is a diagram showing an example of an additional login page, in accordance with embodiments of the present invention.

FIG. 7A is a diagram showing an example of user authority management information, in accordance with embodiments of the present invention.

FIG. 7B is a diagram showing an example of authority content management information, in accordance with embodiments of the present invention.

FIG. 7C is a diagram showing an example of user state management information, in accordance with embodiments of the present invention.

FIG. 11A is a diagram showing another example of the user authority management information, FIG. 11B is a diagram showing another example of the authority content management information, and FIG. 11C is a diagram showing another example of the user state management information, in accordance with embodiments of the present invention.

DETAILED DESCRIPTION

Figure 1:
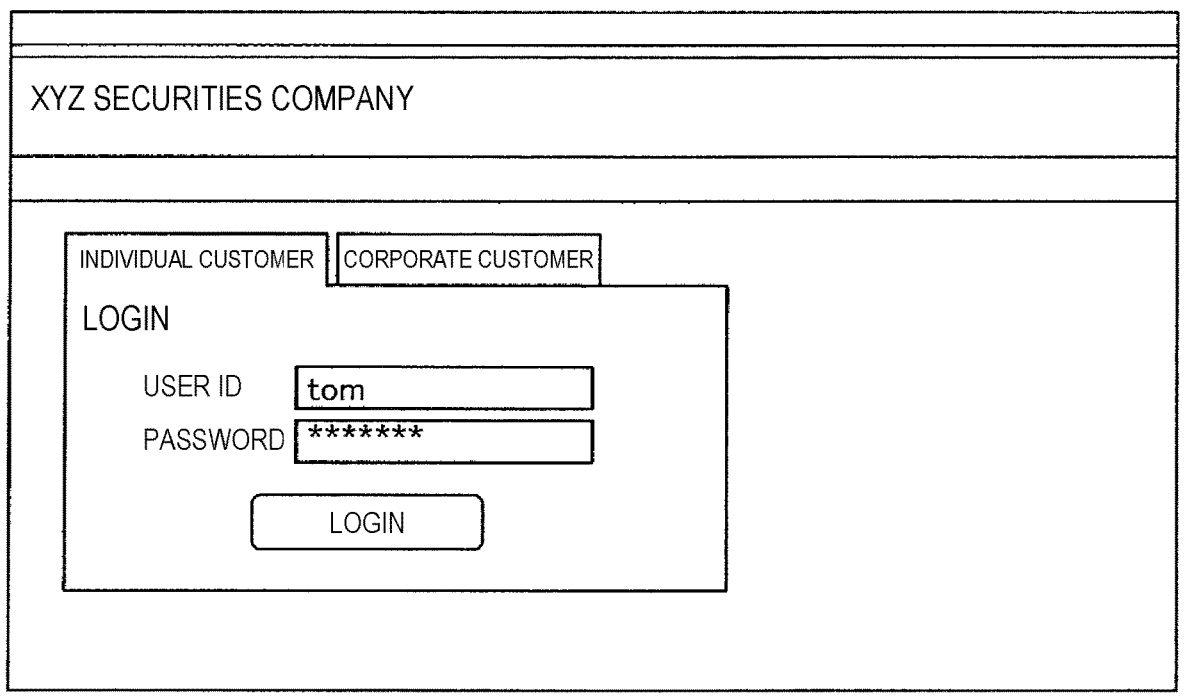
FIG. 1 is a diagram showing an example of a login page, in accordance with embodiments of the present invention.

In the case of sharing one web screen among multiple users in a web system or a general computer system which requires authentication (login), it is conventional to log in with a user ID of any one of the multiple users. Therefore, data displayed on the web screen is limited to data accessible from the logged-in user. If it is desired to display data accessible from another user on the web screen, it is necessary for the logged-in user to log off once and newly log in with the other user's user ID. Thus, there is a problem that it is not possible to display the data accessible from the other user on the web screen while the logged-in user continues to log in. In the prior art, it is not possible to display a sum set, a product set, etc. of the data accessible from the logged-in user and the data accessible from the other user on the web screen.

The present invention enables login by multiple users and enables a logged-in user to access a part of a database accessible from another user.

The present invention provides an apparatus for controlling user access to a database, comprising: an accepting section configured to accept a first login by a first user and a second login by the first user under the name of a second user; and an accessing section configured to perform access for referring to third data based on first data of the database accessible from the first user and second data of the database accessible from the second user, upon request to refer to the database under the name of the first user or the second user after the first login and the second login are accepted. The first and second users are different user. The name of the second user differs from the name of the first user.

Referring to data means accessing data (e.g., reading data). Reference mode means access mode (e.g., read mode).

This apparatus may further comprise a storing section configured to store login information indicating that a temporary user indicating a combination of the first user and the second user is logging in when the first login and the second login are accepted, wherein the accessing section recognizes, on the basis of the login information, that the first login and the second login have been accepted.

Further, this apparatus may further comprise a storing section configured to store access authority information indicating a temporary user's authority of access to the database when the first login and the second login are accepted, the temporary user indicating a combination of the first user and the second user, wherein the accessing section determines the third data on the basis of the access authority information.

Further, the accessing section may perform access for referring to the third data that is a sum set or a product set of the first data and the second data.

The apparatus may further comprise an outputting section configured to output the third data obtained by performing a predetermined calculation for a part of the first data and a part of the second data corresponding to an item common to the first data and the second data.

The accessing section may, upon request to update the database under the name of one of the first user and the second user after the first login and the second login are accepted, perform access for updating data of the database accessible from the one of the users in a state where the first and second users are logged in. In that case, the accepting section may accept a switching instruction to switch from a reference mode for referring to the database to an update mode for updating the database with information about one of the users inputted in response to an inquiry associated with the switching instruction.

Further, the present invention also provides an apparatus for controlling user access to a record of a database including items and numerical values corresponding to the items, the apparatus comprising: an accepting section configured to accept first login by a first user and second login by the first user under the name of a second user; and an outputting section configured to output, upon request to output a record of the database under the name of the first user or the second user after the first login and the second login are accepted, a record generated by turning a first record accessible from the first user and a second record accessible from the second user into one record if the first record and the second record include an item in common, and including, into the one record, a total value of a numerical value corresponding to the item in common included in the first record and a numerical value corresponding to the item in common included in the second record.

Furthermore, the present invention also provides a method for controlling user access to a database, the method comprising the steps of: accepting a first login by a first user and a second login by the first user under the name of a second user; and referring to third data based on first data of the database accessible from the first user and second data of the database accessible from the second user, upon request to refer to the database under the name of the first user or the second user after the first login and the second login are accepted.

Furthermore, the present invention also provides computer readable program code, stored on a hardware storage device and, upon being executed by a computer, causes the computer to function as an apparatus for controlling user access to a database, the program causing the computer to function as: an accepting section configured to accept a first login by a first user and a second login by the first user under the name of a second user; and an accessing section configured to perform access for referring to third data based on first data of the database accessible from the first user and second data of the database accessible from the second user, upon request to refer to the database under the name of the first user or the second user after the first login and the second login are accepted.

According to the present invention, login by multiple users becomes possible, and it becomes possible for a logged-in user to access a part of a database accessible from another user.

Conventionally, a web system in which multiple users can use one web screen together has not existed. In other words, a web system which multiple users can use together in one session has not existed. This is because there has not been a mechanism for holding login states of multiple users in one session between a web browser and a DB (database).

Therefore, in the present embodiment, multiple users are enabled to use a web system together in one session. First, description will be made on a use case scenario and an image of a displayed web page (hereinafter simply referred to as a "page") in that case.

Here, as the use case scenario, a case is assumed where Tom and Mary who married recently use a web application of a securities company. It is assumed that Tom and Mary have separate user IDs because they have used the web application of this securities company since before marriage. Tom and Mary have the separate user IDs to manage their own accounts themselves after marriage. However, it is assumed that Tom and Mary want to refer to a portfolio (the number of stocks held for each issue) as a family portfolio.

FIG. 1 is a diagram showing an example of a login page, in accordance with embodiments of the present invention. In FIG. 1, a user ID and password at the time when Tom singly logs in is shown.

Figure 2:
FIG. 2 is a diagram showing an example of a search result page at the time of single-user login, in accordance with embodiments of the present invention.

FIG. 2 is a diagram showing an example of a search result page at the time when Tom singly logs in, in accordance with embodiments of the present invention. Here, only Tom's portfolio is shown. A family member login button 12 is also shown on this page. The family member login button 12 is a button to be pressed down to trigger displaying a family's portfolio together.

FIG. 3 is a diagram showing an example of an additional login page, in accordance with embodiments of the present invention. When the family member login button 12 is pressed down in FIG. 2, this additional login page is displayed. In FIG. 3, a user ID and password at the time when Mary additionally logs in are shown.

Figure 4:
FIG. 4 is a diagram showing an example of a search result page of individual portfolios at the time of additional login, in accordance with embodiments of the present invention.
Figure 5:
FIG. 5 is a diagram showing an example of a search result page of a family portfolio at the time of additional login, in accordance with embodiments of the present invention.

FIGS. 4 and 5 are diagrams showing an example of a search result page at the time when Mary additionally logs in, in accordance with embodiments of the present invention. In this case, since Tom and Mary are both logged in, the portfolios for Tom and Mary are displayed. In FIG. 4, Tom's portfolio and Mary's portfolio are separately displayed on a display screen by selecting an individual portfolio tab 13. In FIG. 5, a result of totaling values of the portfolio holdings that both Tom and Mary have is displayed on a display screen by selecting a family's total tab 14. Specifically, value for B Company is 765000 obtained by adding up Tom's 510000 and Mary's 255000 as shown on a line 15. A value for C Company is 19800 obtained by adding up Tom's 1800 and Mary's 18000 as shown on a line 16. In the present embodiment, B Company and C Company are used as examples of an item, and the value for B Company and the value for C Company are used as examples of a numerical value corresponding to the item.

Although the preceding description has been made only on the case of referring to a DB in this use case scenario, a case of updating a DB is also conceivable. For example, a case of buying stocks or selling held stocks is the case. Though such update of a DB can be implemented by transitioning from a reference mode to an update mode, a scenario in the update mode will be omitted here.

Figure 13:
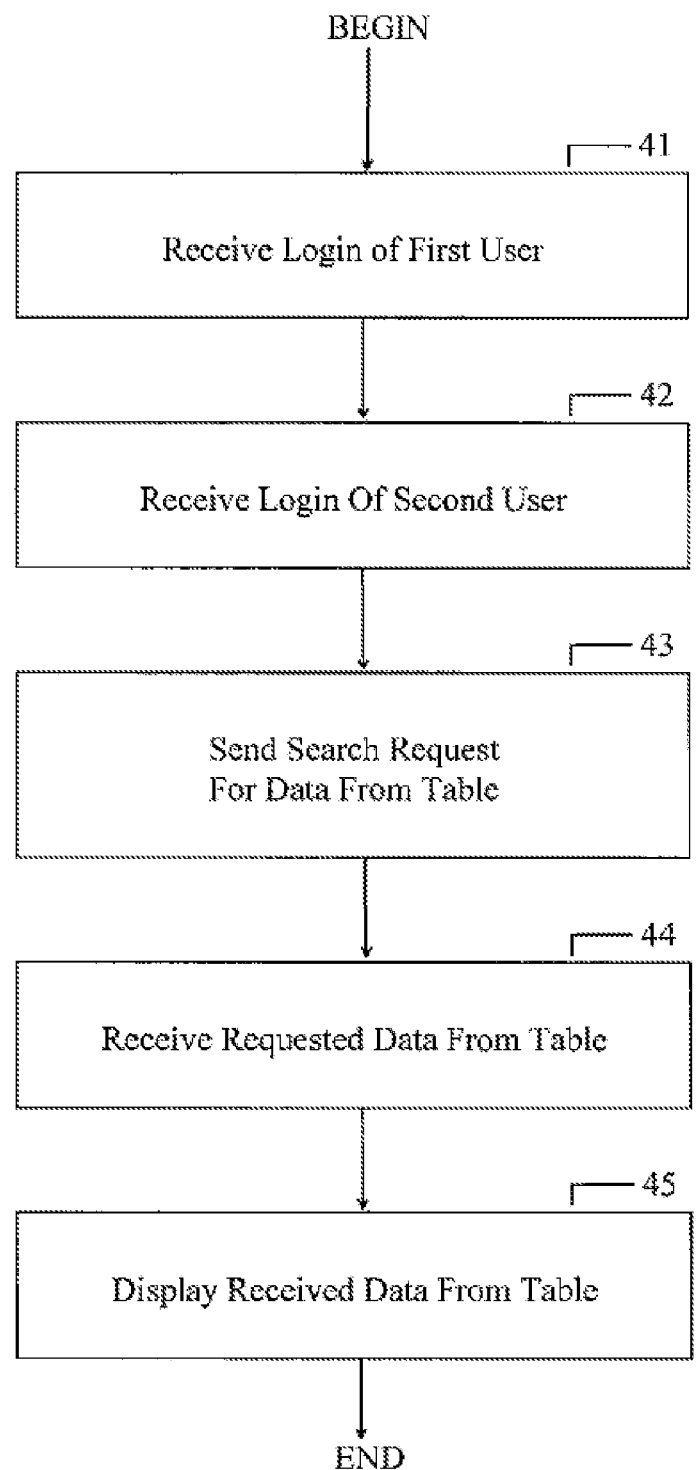
FIG. 13 is a flow chart for a method for accessing data in a database table, in accordance with embodiments of the present invention.

FIG. 13 is a flow chart for a method for accessing data in a database table, in accordance with embodiments of the present invention. The flow chart of FIG. 13 is illustrated in FIGS. 4 and 5 and includes steps 41-45.

In step 41, a processor of a first computer (e.g., computer 10) receives a login of a first user to the first computer using a first user ID.

In step 42, the processor receives a login of a second user, by the first user, to the first computer using a second user ID that differs from the first user ID.

In step 43, the processor sends, to a second computer (e.g., computer 20) having access to a database table while the first user and the second user are simultaneously logged into the first computer, a search request for first data and second data, from the table, that the first user and the second user is authorized to access, respectively.

In step 44, after the search request is sent, the processor receives, from the second computer, the requested first and second data in the table. The received first and second data comprises individual data and family data. The individual data comprises a first set of rows of the table that the first user is authorized to access and a second set of rows of the table that the second user is authorized to access. The family data is (i) a sum set consisting of a combination of the first set of rows and the second set of rows or (ii) a product set consisting of a combination of the rows that both the first set of rows and the second set of rows comprise.

In step 45, the processor displays, in a user interface on a display screen of the first computer, the individual data or the family data, in response to the individual data or the family data having been selected in the user interface by the first user or the second user.

In one embodiment, the individual data is displayed.

In one embodiment, the family data is displayed, wherein the family data is the sum set or the product set.

Figure 6:
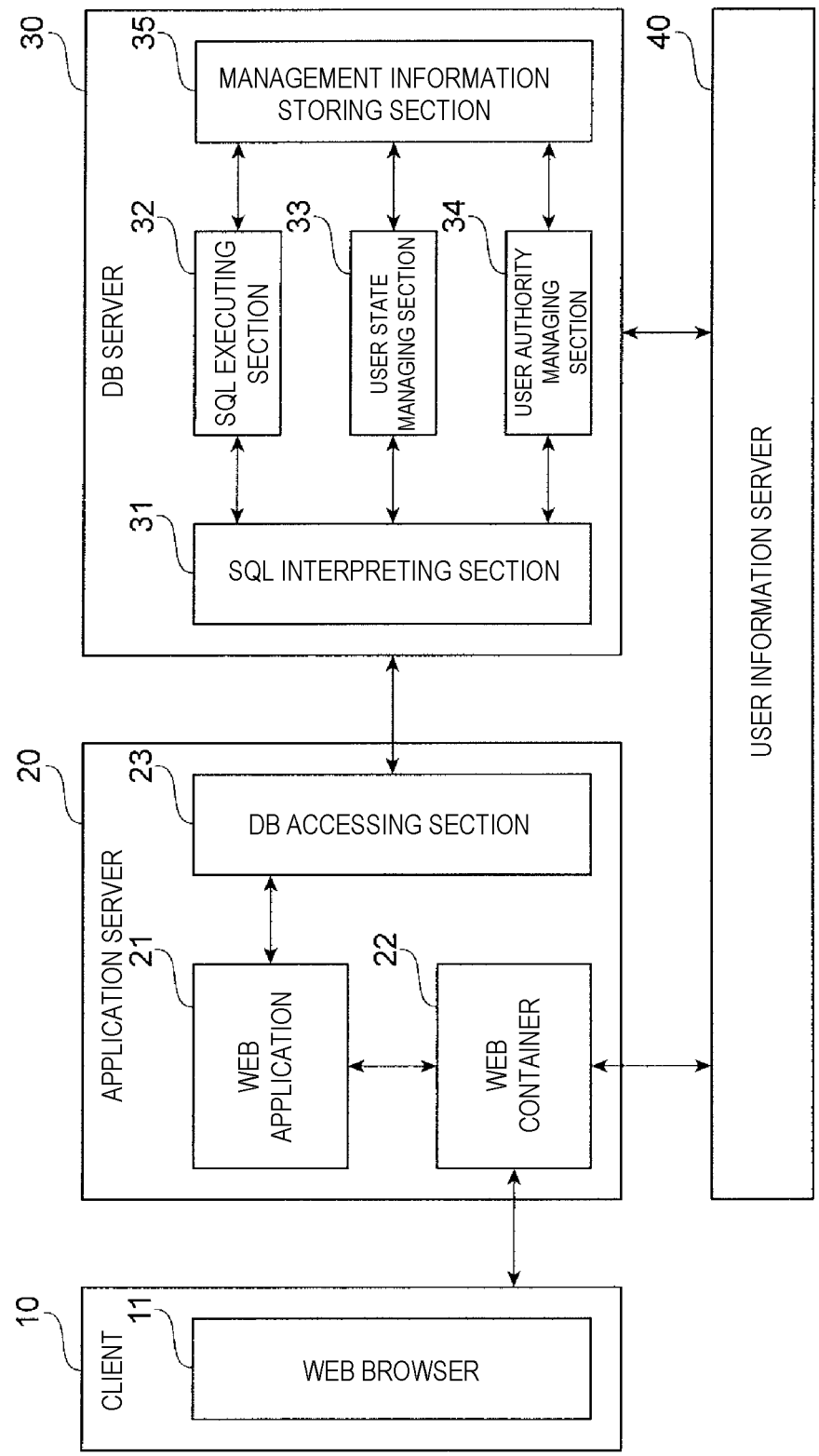
FIG. 6 is a diagram showing an example of a configuration of a web system, in accordance with embodiments of the present invention.

FIG. 6 is a diagram showing an example of a configuration of a web system for implementing the present invention. As shown in FIG. 6, this web system includes a client 10, an application server 20, a DB server 30 and a user information server 40. It is assumed that the client 10 and the application server 20 are connected via a communication line (not shown) such as the Internet, and that the application server 20, the DB server 30 and the user information server 40 are connected via a communication line (not shown) such as a LAN (Local Area Network). Although only one client 10 is shown in FIG. 6, two or more clients 10 may be provided.

The client 10 is a computer apparatus (i., a client computer) which a user uses at the time of using a service by the application server 20, which is or is comprised by a server computer. A web browser 11 is installed in the client 10. The web browser 11 transmits an HTTP request to the application server 20 in response to a user operation and receives an HTTP response, which is a response to the HTTP request, from the application server 20. Here, a desktop PC (Personal Computer), a notebook PC, a tablet PC, a wearable computer, a PDA (Personal Digital Assistant), a smartphone, a mobile phone or the like can be used as the client 10.

The application server 20 is a computer apparatus which provides services to the client 10 in cooperation with the DB server 30. Here, a desktop PC (Personal Computer) or the like can be used as the application server 20. The application server 20 includes a web application 21, a web container 22 and a DB accessing section 23.

The web application 21 holds a user interface for multiple users to log in. When the web application 21 is called by the web container 22, and the user interface is requested, the web application 21 returns an application execution result including the user interface to the web container 22. Upon being called by the web container 22 and requested to perform DB access, the web application 21 requests the DB accessing section 23 to perform DB access. Upon receiving a DB access result from the DB accessing section 23 in response to the DB access request, the web application 21 returns an application execution result based on the DB access result to the web container 22. In the present embodiment, the web application 21 is provided as an example of an outputting section for outputting data.

Upon receiving an HTTP request from the web browser 11, the web container 22 gives a request based on the HTTP request to the web application 21. If the HTTP request requests a login including a user ID and a password, the web container 22 inquires of the user information server 40 whether the user ID and the password are correct. If an inquiry result from the user information server 40 shows that the user ID and the password are correct, the web container 22 generates a new cookie value by a hash function or the like using the user ID and other values and associates the new cookie value with the user ID. Specifically, the web container 22 includes correspondence between the new cookie value and the user ID into cookie value/user ID correspondence information (hereinafter simply referred to as "correspondence information") which includes correspondences between cookie values and user IDs. At that time, if an already authenticated cookie is included in the HTTP request, the web container 22 identifies a user ID associated with the cookie value of the authenticated cookie in the correspondence information, uses this user ID to generate a new cookie value, and includes correspondence between the new cookie value and this user ID into the correspondence information. Upon receiving an application execution result from the web application 21, the web container 22 transmits an HTTP response which includes the execution result to the web browser 11. In the present embodiment, the web container 22 is provided as an example of an accepting section for accepting user login.

Upon being requested from the web application 21 to perform DB access, the DB accessing section 23 transmits an SQL command corresponding to the DB access, to the DB server 30. Especially, the DB accessing section 23 transmits an SQL extended command for accessing a DB in a state where multiple users are simultaneously logged in, to the DB server 30. Upon receiving an SQL execution result, which is an execution result of the SQL command, from the DB server 30, the DB accessing section 23 returns a DB access result based on the SQL execution result to the web application 21.

The DB server 30 is a computer apparatus which includes a DB and reads data to be used by the application server 20 at the time of providing a service, from the DB and provides the data. Here, a desktop PC or the like can be used as the DB server 30. The DB server 30 includes an SQL interpreting section 31, an SQL executing section 32, a user state managing section 33, a user authority managing section 34 and a management information storing section 35.

Upon receiving an SQL command from the application server 20, the SQL interpreting section 31 instructs the SQL executing section 32 to execute the SQL command. Upon receiving the SQL extended command, for accessing a DB in a state where multiple users are simultaneously logged in, from the application server 20, the SQL interpreting section 31 instructs the user state managing section 33 and the user authority managing section 34 to execute the SQL extended command. Upon receiving an SQL execution result, which is a result of executing the SQL command, from the SQL executing section 32, the SQL interpreting section 31 transmits the SQL execution result to the application server 20.

By executing the SQL command which the SQL interpreting section 31 has received, the SQL executing section 32 refers to or updates the DB. At that time, the SQL executing section 32, which identifies a user who is logged in on the basis of user state management information stored in the management information storing section 35, determines access authority of the user on the basis of user authority management information and authority content management information stored in the management information storing section 35, and executes the SQL command on the basis of the access authority. In the present embodiment, the SQL executing section 32 is provided as an example of an accessing section which performs access for referring to data or access for updating data.

The user state managing section 33 manages state transitions of users with the user state management information stored in the management information storing section 35 on the basis of the SQL extended command received by the SQL interpreting section 31. Specifically, the user state managing section 33 manages a login state of a temporary user that is virtually logged in when multiple users are simultaneously logged in (hereinafter referred to as a "temporary user"). The temporary user is created in response to the multiple users being simultaneously logged in. The user state managing section 33 also performs switching between the reference mode and the update mode at the time of accessing the DB. Furthermore, the user state managing section 33 identifies an operating user in the update mode and stores login states of users other than the operating user.

The user authority managing section 34 determines access authority of the temporary user on the basis of access authorities of the multiple logged-in users managed with the user authority management information and authority content management information stored in the management information storing section 35 and manages the access authority of the temporary user with the user authority management information and authority content management information stored in the management information storing section 35.

The management information storing section 35 stores the user authority management information, authority content management information and user state management information described above. Each of the pieces of management information will be described later. In the present embodiment, the user authority management information and the authority content management information are used as examples of access authority information, and the user state management information is used as an example of login information. The management information storing section 35 is provided as an example of a storing section which stores the access authority information or the login information.

The user information server 40 is a computer apparatus which provides user information (a user ID and a password) to the application server 20 or the DB server 30. Specifically, when it is inquired from the application server 20 whether a user ID and a password are correct, the user information server 40 returns, if holding the user ID and the password, an inquiry result indicating whether the user ID and the password are correct. When it is inquired from the DB server 30 whether a user ID and a password are correct, the user information server 40 returns, if holding the user ID and the password, an inquiry result indicating whether the user ID and the password are correct. At that time, the inquiry about whether the user ID and the password are correct can be performed with the use of a protocol such as LDAP (Lightweight Directory Access Protocol). Here, a desktop PC or the like can be used as the user information server 40.

FIGS. 7A to 7C are diagrams showing examples of the pieces of management information stored in the management information storing section 35 of the DB server 30, in accordance with embodiments of the present invention. Here, each of the pieces of management information corresponds to the use case scenario in FIGS. 1 to 5. For example, a user A corresponds to Tom, and a user B corresponds to Mary.

FIG. 7A shows an example of the user authority management information, in accordance with embodiments of the present invention. As shown in FIG. 7A, the user authority management information includes table IDs, user IDs, authority IDs, reference enabled/disabled information and update enabled/disabled information.

The table ID is identification information about a table when the DB is an RDB (Relational DataBase). It may not be possible for Tom's portfolio and Mary's portfolio to be managed with one table in the use case scenario in FIGS. 1 to 5. However, all table IDs are "T1" here for convenience.

The user ID is identification identifies a user. Here, in addition to a user ID "a" of the user A and a user ID "b" of the user B, a user ID "ab" of a temporary user is stored. In one embodiment, the user ID "ab" of the temporary user is a concatenation of the user ID "a" of the user A and the user ID "b" of the user B In the present embodiment, the user A is used as an example of a first user, the user B is used as an example of a second user, and the temporary user is used as an example of a temporary user indicating a combination of the first and second users.

The authority ID is identification information about access authority. Although only authority IDs are stored here, accessible ranges associated with the authority IDs in FIG. 7B are referred to as content of authority.

Reference enabled/disabled information is information indicating whether a user having a corresponding user ID can refer to an accessible range shown by an authority ID of a table having a corresponding table ID. Here, "Y" indicates that referencing the accessible range is permitted, and "N" indicates that referencing the accessible range is not permitted.

Update enabled/disabled information is information indicating whether a user having a corresponding user ID can update an accessible range shown by an authority ID of a table having a corresponding table ID. Here, "Y" indicates that update of the accessible range is permitted, and "N" indicates that update of the accessible range is not permitted.

FIG. 7B shows an example of the authority content management information, in accordance with embodiments of the present invention. As shown in FIG. 7B, the authority content management information includes authority IDs and associated accessible ranges.

The authority ID is identification information about access authority as described above.

The accessible range is information indicating an accessible range of a table having a table ID associated with a corresponding authority ID in FIG. 7A by line numbers of rows of the table. Rows #1, #2, #3 and #4 show information about A Company, B Company, C Company and D Company, respectively, for Tom, and rows #5, #6 and #7 show information about B Company, C Company and E Company, respectively, for Mary. An accessible range corresponding to an authority ID "P12" is shown by rows #1-7 which is a sum set of an accessible range corresponding to an authority ID "P1" and an accessible range corresponding to an authority ID "P2" in accordance with the use case scenario in FIGS. 1 to 5. However, accessible ranges other than those are also conceivable depending on an assumed application. For example, in an application, such as an in-company message board for which the disclosure range is restricted, the accessible range corresponding to the authority ID "P12" may be a product set of the accessible range corresponding to the authority ID "P1" and the accessible range corresponding to the authority ID "P2". Otherwise, more generally, the accessible range corresponding to the authority ID "P12" may be a range obtained by performing predetermined calculation for the accessible range corresponding to the authority ID "P1" and the accessible range corresponding to the authority ID "P2". Otherwise, much more generally, the accessible range corresponding to the authority ID "P12" may be a range based on the accessible range corresponding to the authority ID "P1" and the accessible range corresponding to the authority ID "P2". In the present embodiment, rows #1-4 are used as an example of first data, rows #5-7 are used as an example of second data, and rows #1-7 are used as an example of third data based on the first and second data.

FIG. 7C shows an example of the user state management information, in accordance with embodiments of the present invention. As shown in FIG. 7C, the user state management information includes user IDs, "connected" flags and "all-users" flags.

The user ID is identification information about a user as described above.

The "connected" flag is a flag indicating whether a user having a corresponding user ID is connected to the DB. This flag is "1" when the user is connected to the DB and is "0" when the user is not connected to the DB.

The "all-users" flag is a flag indicating whether a user having a corresponding user ID comprises all of the multiple users who are currently logged in. The "all-users" flag is "1" when the user comprises all of the multiple users who are currently logged in and is "0" when the user does not comprise all of the multiple users who are currently logged in.

Figure 8:
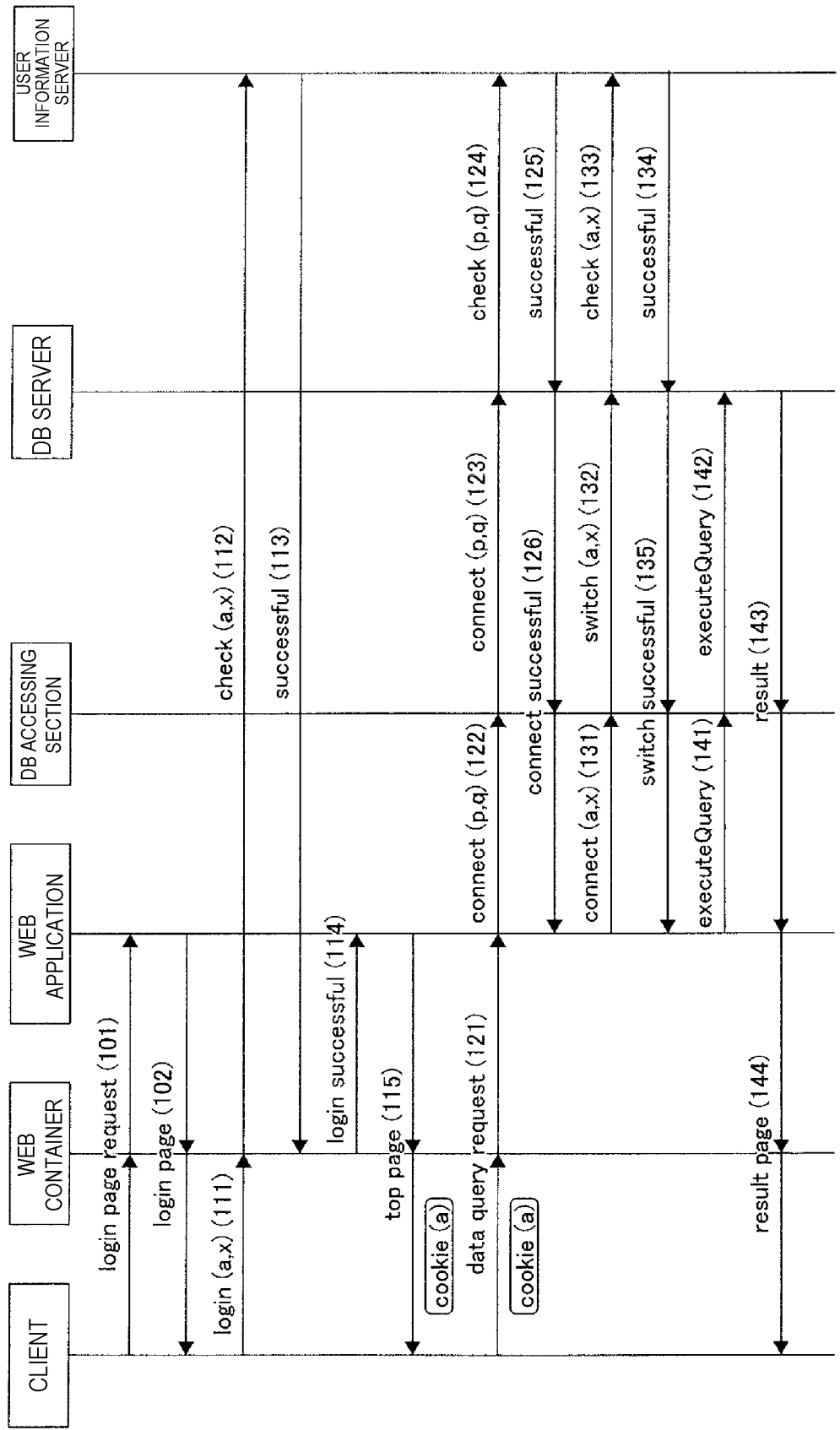
FIG. 8 is a sequence diagram showing an operation example of the web system at the time of searching for information in a state where a user A is singly logging in, in accordance with embodiments of the present invention.

FIG. 8 is a sequence diagram showing an operation example of the web system at the time of searching for information in a state where the user A is singly logged in, in accordance with embodiments of the present invention. Here, this operation example also corresponds to the use case scenario in FIGS. 1 to 5, and the user A corresponds to Tom.

First, if the user A performs an operation of requesting a login page, the client 10 transmits an HTTP request requesting the login page to the web container 22, and the web container 22 calls the web application 21 and requests the login page (step 101). Then, the web application 21 sends the login page to the web container 22, and the web container 22 transmits an HTTP response indicating the login page to the client 10 (step 102). The login page in FIG. 1 is displayed on the client 10. At this time point, however, neither a user ID nor a password has been inputted.

Next, if the user A performs login using the user ID "a" and a password "x" on the login page, the client 10 transmits a HTTP request to that effect to the web container 22 (step 111). Then, the web container 22 requests the user information server 40 to perform authentication checking on the user ID "a" and the password "x" (step 112). Then, when the user information server 40 returns a reply to the effect that authentication checking is successful to the web container 22, the web container 22 receives the reply to that effect (step 113), and notifies the web application 21 that login is successful (step 114). Then, the web application 21 sends a page to the web container 22, and the web container 22 transmits an HTTP response indicating the page to the client 10 (step 115). At that time, the web container 22 stores correspondence information which includes correspondence between a cookie value and the user ID "a" and transmits a cookie having the cookie value to the client 10.

Then, if the user A performs an operation of requesting data search, the client 10 transmits an HTTP request requesting data search to the web container 22, and the web container 22 calls the web application 21 and requests data search (step 121). At that time, the client 10 transmits the cookie sent at step 115 to the web container 22, and the web container 22 holds the user ID "a" associated with the cookie value of the cookie in the correspondence information.

The web application 21 connects to the DB server 30. In the present embodiment, however, the web application 21 is assumed to switch between users so as to, after connecting to the DB server 30 by a representative user who is a user at the time of connecting to the DB server 30 as an application, connect to the DB server 30 by a user who has logged in the web application 21.

That is, the web application 21 requests the DB accessing section 23 to connect to the DB server 30 using a user ID "p" of the representative user and a password "q" corresponding to the user ID "p" (step 122). Then, the DB accessing section 23 transmits an SQL command for performing connection using the user ID "p" and the password "q" to the DB server 30 (step 123). Thereby, the DB server 30 connects the representative user. At that time, the DB server 30 requests the user information server 40 to perform authentication checking on the user ID "p" and the password "q" (step 124). Then, when the user information server 40 returns a reply to the effect that authentication checking is successful to the DB server 30, the DB server 30 receives the reply to that effect (step 125). When connection of the representative user normally ends, the DB server 30 performs transmission to the effect that connection is successful to the DB accessing section 23, and the DB accessing section 23 notifies the web application 21 to that effect (step 126).

The web application 21 requests the DB accessing section 23 to connect to the DB server 30 using the user ID "a" and the password "x" (step 131). Here, as the user ID "a", what was held by the web container 22 at step 121 can be received and used. As the password "x", what was associated with the cookie value by the web container 22 at step 113 and acquired on the basis of the cookie value of the cookie received by the web container 22 at step 121 can be received and used. Otherwise, what is acquired by the web container 22 newly inquiring of the user information server 40 may be received and used. Then, the DB accessing section 23 transmits an SQL command for switching the connected user to the user A using the user ID "a" and the password "x" to the DB server 30 (step 132). Thereby, the DB server 30 switches the connected user to the user A. At that time, the DB server 30 requests the user information server 40 to perform authentication checking on the user ID "a" and the password "x" (step 133). Then, when the user information server 40 returns a reply to the effect that authentication checking is successful to the DB server 30, the DB server 30 receives the reply to that effect (step 134). When switching of the connected user to the user A normally ends, the DB server 30 performs transmission to the effect that switching is successful to the DB accessing section 23, and the DB accessing section 23 notifies the web application 21 to that effect (step 135).

After that, the web application 21 requests the DB accessing section 23 to execute a query for searching for a table T1 (step 141). Then, the DB accessing section 23 transmits an SQL command for searching for the table T1 to the DB server 30 (step 142). Then, when the DB server 30 returns a search result to the DB accessing section 23, the DB accessing section 23 returns the search result to the web application 21 (step 143). The web application 21 transmits a search result page to the web container 22, and the web container 22 transmits an HTTP response indicating the search result page to the client 10 (step 144). Then, the search result page in FIG. 2 is displayed on the client 10.

Figure 9:
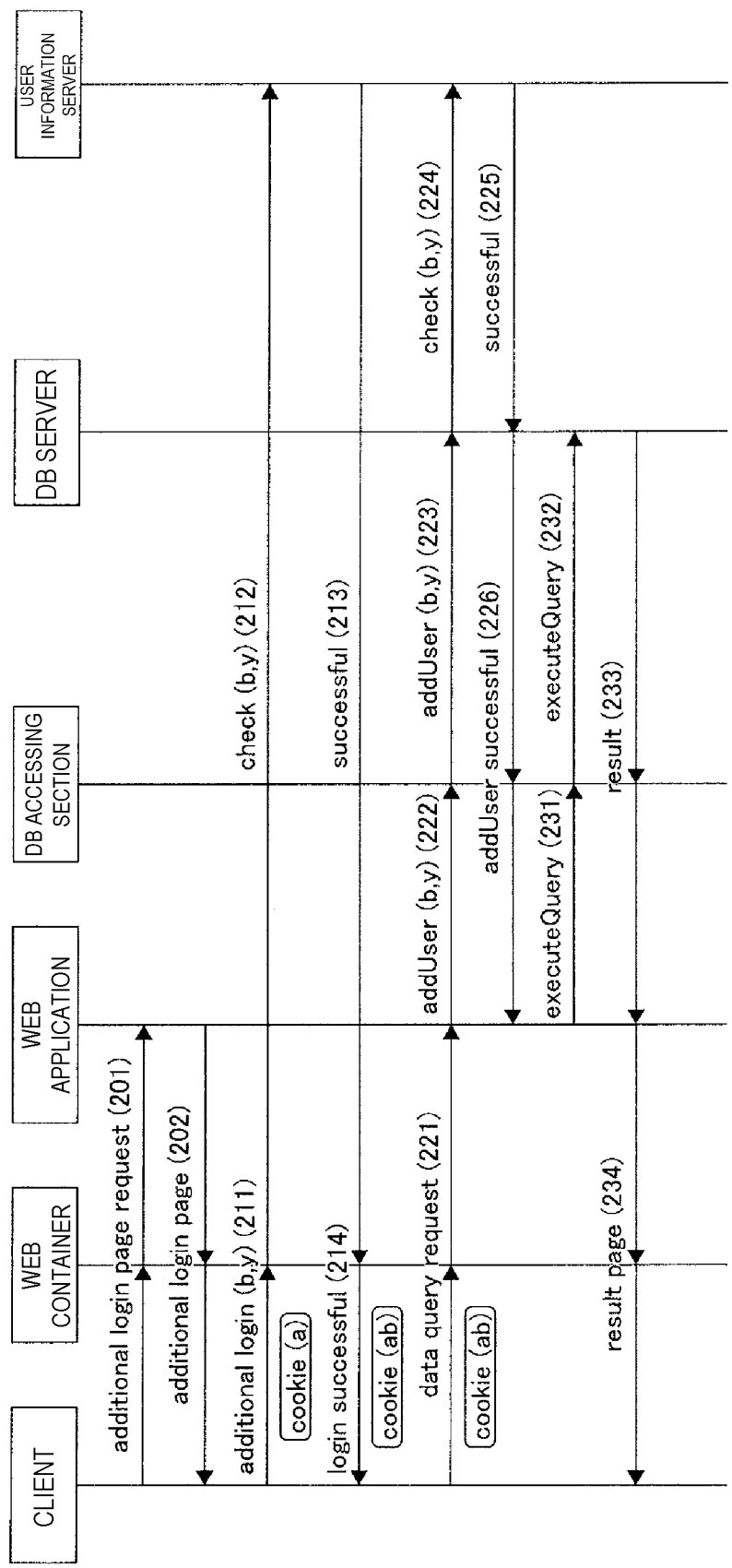
FIG. 9 is a sequence diagram showing an operation example of the web system at the time of searching for information in a state where a user B is additionally logging in, in accordance with embodiments of the present invention.

FIG. 9 is a sequence diagram showing an operation example of the web system at the time of searching for information in a state where the user B is additionally logging in, in accordance with embodiments of the present invention. Here, this operation example also corresponds to the use case scenario in FIGS. 1 to 5, and the users A and B correspond to Tom and Mary, respectively. The user B is an example of the second user.

First, if the user A performs an operation of requesting an additional login page, the client 10 transmits an HTTP request requesting the additional login page to the web container 22, and the web container 22 calls the web application 21 and requests the additional login page (step 201). Then, the web application 21 sends the additional login page to the web container 22, and the web container 22 transmits an HTTP response indicating the additional login page to the client 10 (step 202). The additional login page in FIG. 3 is displayed on the client 10. At this time point, however, neither a user ID nor a password has been inputted.

Next, if the user A performs additional login of the user B using the user ID "b" and a password "y" on the additional login page, the client 10 transmits an HTTP requests to that effect to the web container 22 (step 211). At that time, the client 10 transmits the cookie sent at step 115 in FIG. 8 to the web container 22, and the web container 22 holds the cookie value of the cookie. Then, the web container 22 requests the user information server 40 to perform authentication checking on the user ID "b" and the password "y" (step 212). Then, when the user information server 40 returns a reply to the effect that authentication checking is successful to the web container 22, the web container 22 receives the reply to that effect (step 213), and notifies the client 10 that login is successful (step 214). At that time, the web container 22 newly generates a cookie value from the user ID "a" associated with the cookie value held at step 211 in the correspondence information and the user ID "b" for which authentication checking was successful at step 213. Then, the web container 22 includes correspondences between the new cookie value and the user IDs "a" and "b" into the correspondence information. After that, the web container 22 transmits a cookie having the cookie value to the client 10.

Then, if the user A performs an operation of requesting data search, the client 10 transmits an HTTP request requesting data search to the web container 22, and the web container 22 calls the web application 21 and requests data search (step 221). At that time, the client 10 transmits the cookie sent at step 214 to the web container 22, and the web container 22 stores the user IDs "a" and "b" associated with the cookie value of the cookie in the correspondence information. The web application 21 requests the DB accessing section 23 to additionally connect the user B using the user ID "b" and the password "y" (step 222). It is known by receiving the user IDs "a" and "b" held at step 221 by the web container 22 and comparing the user IDs "a" and "b" with the user ID "a" of the user who is already holding a login state himself that the user B should be additionally connected. As the password "y", what was associated with the cookie value by the web container 22 at step 213 and acquired on the basis of the cookie value of the cookie received by the web container 22 at step 221 can be received and used. Otherwise, what is acquired by the web container 22 newly inquiring of the user information server 40 may be received and used. Then, the DB accessing section 23 transmits "addUser(b,y)", an SQL command for adding a user using the user ID "b" and the password "y", to the DB server 30 (step 223). Thereby, the DB server 30 additionally connects the user B. At that time, the DB server 30 requests the user information server 40 to perform authentication checking on the user ID "b" and the password "y" (step 224). Then, when the user information server 40 returns a reply to the effect that authentication checking is successful to the DB server 30, the DB server 30 receives the reply to that effect (step 225). When additional connection of the user B normally ends, the DB server 30 performs transmission to the effect that addition of the user is successful to the DB accessing section 23, and the DB accessing section 23 notifies the web application 21 to that effect (step 226).

The DB server 30 specifically performs an operation as below during a period after receiving the SQL command at step 223 until performing transmission to the effect that addition of the user is successful at step 226. That is, first, the SQL interpreting section 31 receives the SQL command "addUser(b,y)". Then, the user state managing section 33 and the user authority managing section 34 store information about the temporary user having the user ID "ab" that is constituted by the user A who is connecting at that time point and the user B for whom addition has been instructed, into the management information storing section 35. Specifically, although the user authority management information stored in the management information storing section 35 includes only the first and second lines in FIG. 7A first, the user authority managing section 34 adds the third line in FIG. 7A thereto. Although the authority content management information stored in the management information storing section 35 includes only the first and second lines in FIG. 7B first, the user authority managing section 34 adds the third line in FIG. 7B thereto. At that time, the user authority managing section 34 may specify whether the accessible range on the third line is to be indicated by a sum set or product set of the accessible ranges on the first and second lines, with a parameter. Furthermore, although the user state management information stored in the management information storing section 35 includes only the first and second lines in FIG. 7C first, the user state managing section 33 adds the third line in FIG. 7C thereto. In such an operation, it is desirable to perform the request for authentication checking on the user ID "b" and the password "y" at step 224 and reception of the reply to the effect that authentication checking is successful at step 225 immediately after the SQL interpreting section 31 receives the SQL command "addUser(b,y)".

After that, the web application 21 requests the DB accessing section 23 to execute a query for searching for the table T1 (step 231). Then, the DB accessing section 23 transmits the SQL command for searching for the table T1 to the DB server 30 (step 232). Then, when the DB server 30 returns a search result to the DB accessing section 23, the DB accessing section 23 returns the search result to the web application 21 (step 233).

The DB server 30 specifically performs an operation as below during a period after receiving the SQL command at step 232 until returning the search result at step 233. That is, first, the SQL interpreting section 31 receives the SQL command for searching for the table T1. Next, the SQL executing section 32 identifies the user ID "ab" associated with a "connected" flag "1" in the user state management information stored in the management information storing section 35. Then, the SQL executing section 32 identifies the authority ID "P12" associated with the user ID "ab" in the user authority management information stored in the management information storing section 35 and determines the accessible range "rows #1-7" associated with the authority ID "P12" in the authority content management information stored in the management information storing section 35. Next, the SQL interpreting section 31 returns rows #1-7 of the table T1 to the DB accessing section 23 as a search result.

After that, the web application 21 transmits a search result page to the web container 22, and the web container 22 transmits an HTTP response indicating the search result page to the client 10 (step 234). Thereby, the search result page in FIG. 4 or 5 is displayed on the client 10.

Although the user A who logs in first performs additional login of the user B and, after that, requests data search under the name of the user B in this operation example, this is not limiting. The user A may request data search under the user A's own name after performing additional login of the user B.

Figure 10:
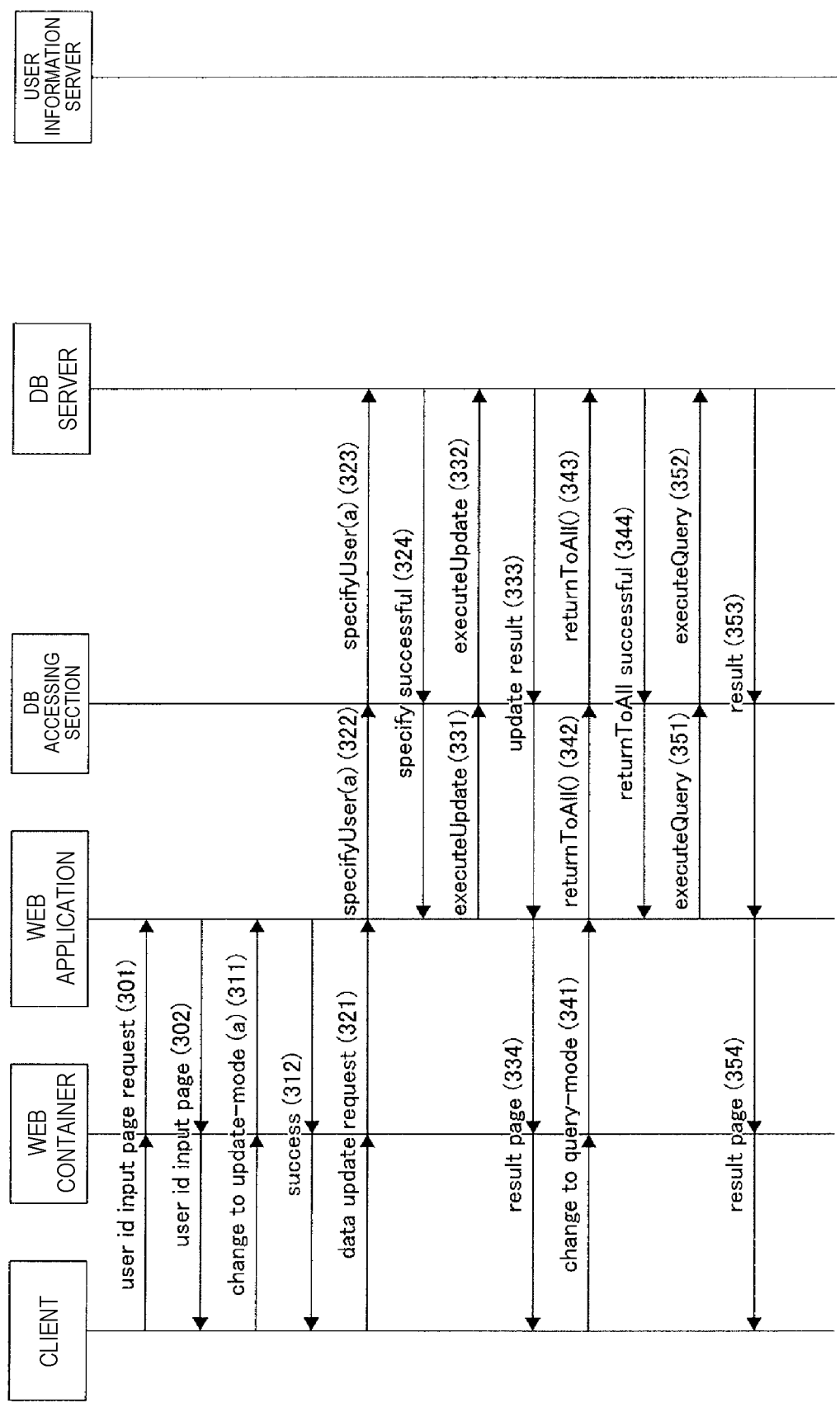
FIG. 10 is a sequence diagram showing an operation example of the web system at the time of updating information in a state where the users A and B are logging in, in accordance with embodiments of the present invention.

FIG. 10 is a sequence diagram showing an operation example of the web system at the time of updating information in a state where the users A and B are logging in, in accordance with embodiments of the present invention. Here, this operation example also corresponds to the use case scenario in FIGS. 1 to 5, and the users A and B correspond to Tom and Mary, respectively. Further, in this operation example, it is assumed that, even in the state where the users A and B are logging in, it is possible to change the reference mode to the update mode, cause any of the users to be an operating user in the update mode and cause only the operating user to be able to perform an update operation. Here, description will be made on the assumption that the user A is the operating user in the update mode. The client 10 attaches a held cookie to all HTTP requests to transmit the HTTP requests. However, since the application server 20 side does not use a cookie in this operation example, the cookie is omitted in the sequence diagram.

First, if the user A performs an operation of requesting a user ID input page for inputting the user ID of an operating user in the update mode, the client 10 transmits an HTTP request requesting the user ID input page to the web container 22, and the web container 22 calls the web application 21 and requests the user ID input page (step 301). Then, the web application 21 sends the user ID input page to the web container 22, and the web container 22 transmits an HTTP response indicating the user ID input page to the client 10 (step 302).

Next, if the user A performs an operation of requesting change to the update mode by inputting the user ID "a" on the user ID input page, the client 10 transmits an HTTP request requesting change to the update mode to the web container 22, and the web container 22 calls the web application 21 and requests change to the update mode (step 311). At that time, the web application 21 holds the user ID "a" inputted on the user ID input page. Then, the web application 21 performs transmission to the effect that change to the update mode is successful to the web container 22, and the web container 22 transmits an HTTP response to that effect to the client 10 (step 312).

Then, if the user A performs an operation of requesting data update, the client 10 transmits an HTTP request requesting data update to the web container 22, and the web container 22 calls the web application 21 and requests data update (step 321). The web application 21 requests the DB accessing section 23 to identify the operating user using the user ID "a" (step 322). Here, what was held at step 311 can be used as the user ID "a". Then, the DB accessing section 23 transmits "specifyUser(a)", an SQL command for identifying the operating user using the user ID "a", to the DB server 30 (step 323). The DB server 30 identifies the operating user. When identification of the operating user normally ends, the DB server 30 performs transmission to the effect that identification of the operating user is successful to the DB accessing section 23, and the DB accessing section 23 notifies the web application 21 to that effect (step 324).

The DB server 30 specifically performs an operation as below during a period after receiving the SQL command at step 323 until performing transmission to the effect that identification of the operating user is successful at step 324. That is, first, the SQL interpreting section 31 receives the SQL command "specifyUser(a)". Then, the user state managing section 33 changes the connected user from the users A and B to the user A. Specifically, it is assumed that, although the user state management information stored in the management information storing section 35 was what is shown in FIG. 7C first, the "connected" flag "1" has been stored for the user ID "a".

After that, the web application 21 requests the DB accessing section 23 to execute a query for updating the table T1 (step 331). Then, the DB accessing section 23 transmits an SQL command for updating the table T1 to the DB server 30 (step 332). Then, when the DB server 30 returns an update result to the DB accessing section 23, the DB accessing section 23 returns the update result to the web application 21 (step 333).

The DB server 30 specifically performs an operation as below during a period after receiving the SQL command at step 332 until returning the update result at step 333. That is, first, the SQL interpreting section 31 receives the SQL command for updating the table T1. Next, the SQL executing section 32 identifies the user ID "a" associated with the "connected" flag "1" in the user state management information stored in the management information storing section 35. Then, the SQL executing section 32 identifies the authority ID "P1" associated with the user ID "a" in the user authority management information stored in the management information storing section 35, determines an accessible range "row #1-5" associated with the authority ID "P1" in the authority content management information stored in the management information storing section 35, and performs update with this accessible range. Next, the SQL interpreting section 31 returns an update result of rows #1-5 in the table T1 to the DB accessing section 23.

After that, the web application 21 transmits an update result page to the web container 22, and the web container 22 transmits an HTTP response indicating the update result page to the client 10 (step 334).

After update is performed in this way, the user A again returns the state to the state where the users A and B are logging in. In this case, if the user A performs an operation of requesting change to the reference mode, the client 10 transmits an HTTP request requesting change to the reference mode to the web container 22, and the web container 22 calls the web application 21 and requests change to the reference mode (step 341). The web application 21 requests the DB accessing section 23 to return all the users who were logging in first to the login state (step 342). Then, the DB accessing section 23 transmits "returntoAll( )", an SQL command for returning all the users who were logging in first to the login state, to the DB server 30 (step 343). The DB server 30 returns all the users who were logging in first to the login state. When return of all the users who were logging in first to the login state normally ends, the DB server 30 performs transmission to the effect that return is successful to the DB accessing section 23, and the DB accessing section 23 notifies the web application 21 to that effect (step 344).

The DB server 30 specifically performs an operation as below during a period after receiving the SQL command at step 343 until performing transmission to the effect that return is successful at step 344. That is, first, the SQL interpreting section 31 receives the SQL command "returntoAll( )". Then, the user state managing section 33 changes the connected user from the user A to the users A and B. Specifically, although the user state management information stored in the management information storing section 35 is such that the "connected" flag "1" is stored for the user ID "a" in FIG. 7C first, the "connected" flag "1" is stored for the user ID "ab" for which the all-users flag "1" is stored. That is, the state is returned to the state of FIG. 7C.

After that, the web application 21 requests the DB accessing section 23 to execute a query for searching for the table T1 (step 351). Then, the DB accessing section 23 transmits the SQL command for searching for the table T1 to the DB server 30 (step 352). Then, when the DB server 30 returns a search result to the DB accessing section 23, the DB accessing section 23 returns the search result to the web application 21 (step 353).

The DB server 30 specifically performs an operation as below during a period after receiving the SQL command at step 352 until returning the search result at step 353. That is, first, the SQL interpreting section 31 receives the SQL command for searching for the table T1. Next, the SQL executing section 32 identifies the user ID "ab" associated with the "connected" flag "1" in the user state management information stored in the management information storing section 35. Then, the SQL executing section 32 identifies the authority ID "P12" associated with the user ID "ab" in the user authority management information stored in the management information storing section 35 and determines the accessible range "rows #1-7" associated with the authority ID "P12" in the authority content management information stored in the management information storing section 35. Next, the SQL interpreting section 31 returns row #1-7 of the table T1 to the DB accessing section 23 as a search result.

After that, the web application 21 transmits a search result page to the web container 22, and the web container 22 transmits an HTTP response indicating the search result page to the client 10 (step 354).

It is assumed that, after information reference and update are performed in this way, the user A performs an operation of cutting connection to the web system. In the example of the search result page in FIG. 5, an operation of pressing down a logout button 17 corresponds to the operation. When such an operation is performed, the user B who has been additionally logging in also logs out in addition to the user A. Then, the client 10 requests the application server 20 to cut connection, and the application server 20 transmits "disconnect", an SQL command for requesting cutting of connection to the DB, to the DB server 30, although this is not shown.

Thereby, the DB server 30 specifically performs an operation as below. That is, first, the SQL interpreting section 31 receives the SQL command "disconnect". Then, the user state managing section 33 and the user authority managing section 34 delete information about the temporary user having the user ID "ab" from the management information storing section 35. Specifically, although the user authority management information stored in the management information storing section 35 is what is shown in FIG. 7A first, the user authority managing section 34 deletes the third line in FIG. 7A therefrom. Further, although the authority content management information stored in the management information storing section 35 is what is shown in FIG. 7B first, the user authority managing section 34 deletes the third line in FIG. 7B therefrom. Furthermore, although the user state management information stored in the management information storing section 35 is what is shown in FIG. 7C first, the user state managing section 33 deletes the whole thereof.

FIGS. 11A to 11C are diagrams showing other examples of the pieces of management information stored in the management information storing section 35 of the DB server 30, in accordance with embodiments of the present invention.

FIG. 11A shows an example of the user authority management information, in accordance with embodiments of the present invention. Similarly to FIG. 7A, the user authority management information includes table IDs, user IDs, authority IDs, reference enabled/disabled information and update enabled/disabled information. The content is such that information about a user having a user ID "c" and a temporary user having a user ID "abc" is added to FIG. 7A.

FIG. 11B shows an example of the authority content management information, in accordance with embodiments of the present invention. Similarly to FIG. 7B, the authority content management information includes authority IDs and accessible ranges. The content is such that the information about the user having the user ID "c" and the temporary user having the user ID "abc" is added to FIG. 7B.

FIG. 11C shows an example of the user state management information, in accordance with embodiments of the present invention. Similarly to FIG. 7C, the user state management information includes user IDs, "connected" flags and all-users flags. The content is such that the information about the user having the user ID "c" and the temporary user having the user ID "abc" is added to FIG. 7C.

For example, it is assumed that, at the start of the operation shown in FIG. 9, the users A and B are already logging in, and the first to fourth lines of each of the pieces of management information in FIGS. 11A to 11C are stored in the management information storing section 35. Then, if the user A performs additional login of the user C using the user ID "c" and a password "z" on the additional login page, the DB server 30 specifically performs an operation as below during a period after receiving the SQL command at step 223 until performing transmission to the effect that addition of the user is successful at step 226. That is, first, the SQL interpreting section 31 receives the SQL command "addUser(c,z)". Then, the user state managing section 33 and the user authority managing section 34 store information about the temporary user having the user ID "abc" that is constituted by the users A and B who are connecting at that time point and the user C for whom addition has been instructed. Specifically, the user authority managing section 34 adds the fifth line in FIG. 11A to the user authority management information and adds the fifth line in FIG. 11B to the authority content management information. Further, the user state managing section 33 adds the fifth line in FIG. 11C to the user state management information.

In the present embodiment, the two modes, the reference mode and the update mode, are prepared from a viewpoint of which operation is possible against a DB. On the other hand, these modes can be viewed as a sharing mode and a single-user mode from a viewpoint of how many users among multiple users who are logging in can operate the DB; that is, how many users are enabled.

The sharing mode is a mode in which a multiple users are simultaneously enabled. In this sharing mode, an accessible range of the DB is a range based on a set operator. The single-user mode is a mode in which only a specified user among multiple users is an operating user who can operate a DB. In this single-user mode, an accessible range of the DB is limited to an accessible range of the operating user. However, the other users are not logged off. Therefore, it is not necessary to specify a user ID and a password at the time of executing "returnToAll".

Here, a conventional SQL command transmitted from the application server 20 to the DB server 30 can be changed as below. That is, it is recommended that "select" is executable in both of the sharing mode and the single-user mode. On the other hand, it is recommended that "insert", "update" and "delete" are executable only in the single-user mode, and an error is returned in other cases.

Although description has been made on the case of changing the sharing mode in which the users A and B are in a login state to the single-user mode in which only the user A can operate the DB in the present embodiment, this is not limiting. The sharing mode in which the users A and B are in the login state may be changed to the single-user mode in which only the user B can operate the DB. Otherwise, the single-user mode in which only the user A can operate the DB may be changed to the single-user mode in which only the user B can operate the DB, or the opposite change may be performed.

Similar considerations apply to a case where the sharing mode in which the users A, B and C are logging in is the starting point. That is, such a sharing mode may be changed to any of the single-user mode in which only the user A can operate the DB, the single-user mode in which only the user B can operate the DB and the single-user mode in which only the user C can operate the DB. Otherwise, the single-user mode in which only the user A can operate the DB, the single-user mode in which only the user B can operate the DB and the single-user mode in which only the user C can operate the DB may be mutually changed to one another.

Furthermore, although "addUser(user,pwd)", "specify (user)" and "returnToAll( )" are shown as SQL extended commands in the present embodiment, SQL extended commands as below are also conceivable.

First, "addUser(user,pwd,operator)" is conceivable. This is an SQL extended command obtained by making a change in the SQL extended command "addUser(user,pwd)" for causing an additional user to be in a login state while multiple users are already logging in. That is, it is the SQL extended command "addUser(user,pwd)" in which a set operator determining the accessible range of an additional user can be optionally specified with "operator".

Secondly, "delUser(user)" is conceivable. This is an SQL extended command for disconnecting a specified user in a state where multiple users are logging in.

Thirdly, "queryUser(user)" is conceivable. This is an SQL extended command for causing users who are currently logging in to return.

Fourthly, "connect(user1,pwd1,user2,pwd2,user3, pwd3, . . . )" is conceivable. This is an SQL extended command for specifying and connecting multiple users at the same time.

In the present embodiment, a web system which multiple users can use together in one session is implemented as the whole web system. In comparison with a case of implementing such a web system only by the web application 21, the number of times of transmitting and receiving an SQL command decreases, and efficiency is improved.

Further, in the present embodiment, a temporary user is created in the DB server 30. Thus, it becomes unnecessary to read useless data, and efficiency is improved.

Furthermore, in the present embodiment, in consideration that there may be a situation in which it is desired to update a DB even when multiple users are simultaneously logging in, switching between the DB reference mode and the DB update mode is achieved without a user's login or logoff. Thus, the number of times of performing user authentication decreases, and efficiency is improved.

Figure 12:
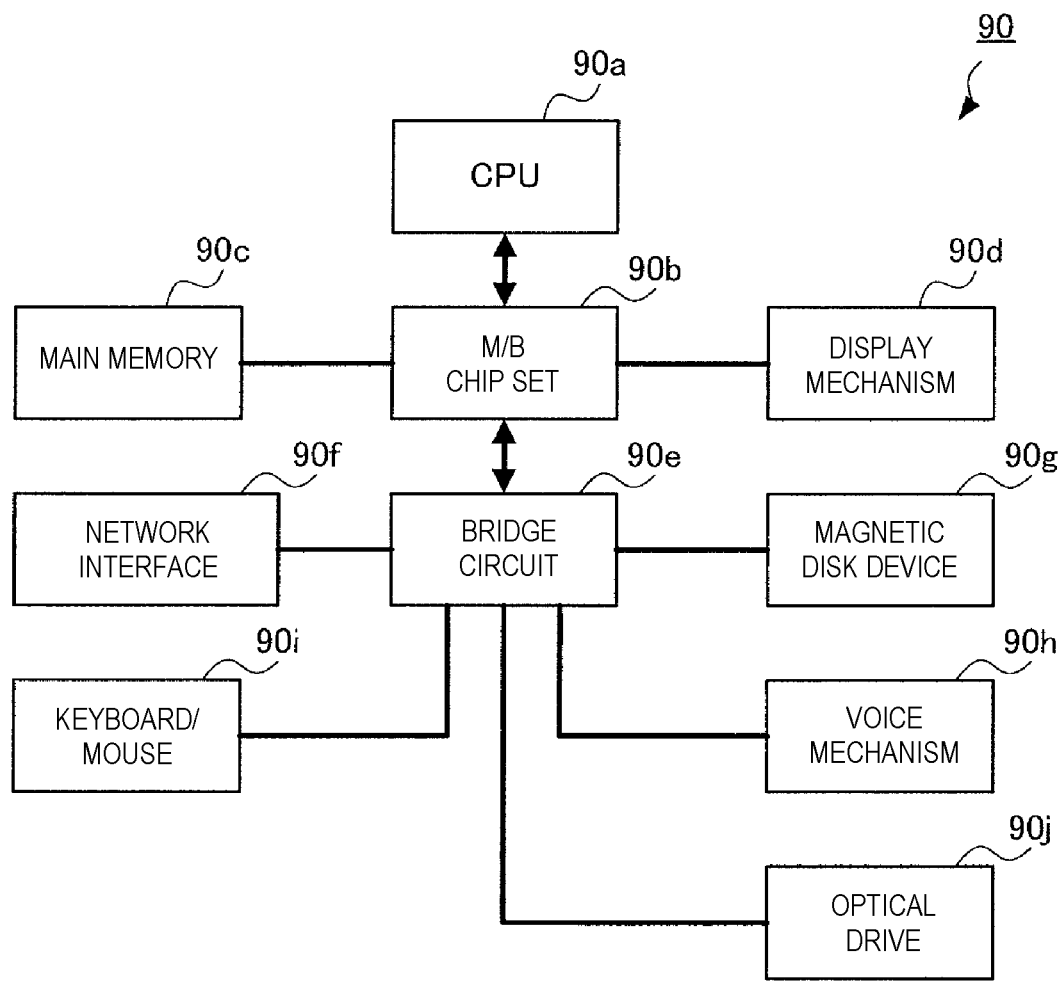
FIG. 12 is a diagram showing a hardware configuration example of a computer to which the embodiment of the present invention is applicable, in accordance with embodiments of the present invention.

Furthermore, in the present embodiment, both of a sum set and a product set can be provided at the time of determining a range where access by multiple users is enabled. Thus, it becomes possible to flexibly correspond to various use purposes. For example, in the case of providing a sum set, it becomes possible to refer to the whole of data accessible from the multiple users (e.g., the sum set of rows #1-10 in FIG. 11B. Further, in the case of providing a product set, it becomes possible to refer to, among data accessible from the multiple users, only data that can be referred to by all the users, and, therefore, information security can be secured. Note that there is no product set in FIG. 11B, since the rows #1-4, #5-7, and #8-10 accessible to users A, B, C, respectively, are mutually exclusive. FIG. 12 is a diagram showing an example of a hardware configuration of a computer 90 to which the embodiment of the present invention is applicable, in accordance with embodiments of the present invention. As shown in FIG. 12, the computer 90 is provided with a CPU (Central Processing Unit) 90a, which is operation means, a main memory 90c connected to the CPU 90a via an MB (Mother Board) chip set 90b, and a display mechanism 90d similarly connected to the CPU 90a via the MB chip set 90b. A network interface 90f, a magnetic disk device (HDD) 90g, a voice mechanism 90*h*, a keyboard/mouse 90*i* and an optical drive 90*j* are connected to the MB chip set 90*b* via a bridge circuit 90*e*.

In FIG. 12, the components are connected via a bus. For example, the CPU 90*a* and the MB chip set 90*b* are connected via a CPU bus, and the MB chip set 90*b* and the main memory 90*c* are also connected via a CPU bus. The MB chip set 90*b* and the display mechanism 90*d* may be connected via an AGP (Accelerated Graphics Port). However, when the display mechanism 90*d* includes a PCI Express-compatible video card, the MB chip set 90*b* and the video card are connected via a PCI Express (PCIe) bus. In the case of connecting with the bridge circuit 90*e*, for example, a PCI Express bus can be used as for the network interface 90*f*. As for the magnetic disk device 90*g*, for example, a serial ATA (AT Attachment) bus, a parallel transfer ATA bus or a PCI (Peripheral Components Interconnect) bus can be used. Furthermore, as for the keyboard/mouse 90*i* and the optical drive 90*j*, a USB (Universal Serial Bus) can be used.

Here, the present invention may be implemented with hardware alone or with software alone. The present invention may be implemented with both of hardware and software. Further, the present invention may be implemented as a computer, a data processing system or a computer program. The computer program may be stored in a computer-readable medium and provided. Here, as the medium, an electronic, magnetic, optical, electromagnetic, infrared or semiconductor system (device or apparatus) or a propagation medium is conceivable. As the computer-readable medium, a semiconductor, a solid-state storage device, a magnetic tape, a removable computer diskette, a random access memory (RAM), a read-only memory (ROM), a rigid magnetic disk and an optical disk are given as examples. Examples of the optical disk at the present point in time include a compact disc read-only memory (CD-ROM), a compact disk read/write (CD-R/W) and a DVD.

The present invention has been described above with the embodiment. The technical scope of the present invention, however, is not limited to the above embodiment. It is apparent to one skilled in the art that it is possible to make various changes or adopt an alternative aspect without departing from the spirit and scope of the present invention.

A computer program product of the present invention comprises a computer readable hardware storage medium/device having a computer readable program code stored therein, said program code containing instructions which, upon being executed by a processor of a computer system, implement the methods of the present invention.

A computer system of the present invention comprises a processor, a memory coupled to the processor, and a computer readable storage device coupled to the processor, said storage device containing program code which, upon being executed by the processor via the memory, implements the methods of the present invention. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for accessing data in a database table, said method comprising:
   displaying a login page on a display screen of a first computer;
   receiving a first user ID and a first password associated with a first user via the displayed login page;
   sending, by a processor of the first computer, a first authentication request for the first user ID and the first password;
   in response to successful authentication of the first user ID and the first password, displaying an additional login page on the display screen of the first computer;
   receiving a second user ID, that differs from the first user ID, and a second password associated with a second user via the displayed additional login page;
   sending, by the processor of the first computer, a second authentication request for the second user ID and the second password without logging out the first user;
   in response to successful authentication of the second user ID and the second password, sending, by the processor of the first computer, to a second computer having access to the database table while the first user and the second user are simultaneously logged in via the first computer, a search request for first data from the database table that the first user is authorized to access and second data from the database table that the second user is authorized to access;
   after said sending the search request, receiving, by the processor of the first computer, the requested first and second data in the database table; and
   displaying, by the processor in a user interface on the display screen of the first computer, the first data that the first user is authorized to access and the second data that the second user is authorized to access.

2. The method of claim 1, wherein the received first and second data comprises individual data and family data, wherein the individual data comprises a first set of rows of the table that the first user is authorized to access and a second set of rows of the table that the second user is authorized to access, wherein the family data is (i) a sum set consisting of a combination of the first set of rows and the second set of rows or (ii) a product set consisting of a combination of the rows that both the first set of rows and the second set of rows comprise.

3. The method of claim 2, wherein displaying the first data and the second data on the display screen of the first computer comprises displaying the family data as the sum set.

4. The method of claim 2, wherein displaying the first data and the second data on the display screen of the first computer comprises displaying the family data as the product set.

5. The method of claim 1, further comprising:
   receiving a first cookie having a first cookie value associated with the first user ID in response to successful authentication of the first user ID and the first password; and
   receiving a second cookie having a second cookie value associated with the first user ID and the second user ID in response to successful authentication of the second user ID and the second password.

6. The method of claim 5, wherein the first cookie having the first cookie value is sent with the second authentication request; and
   wherein the second cookie having the second cookie value is sent with the search request.

7. The method of claim 1, wherein the first data includes data not included in the second data; and
   wherein the second data includes data not included in the first data.

8. A computer program product comprising a computer readable hardware storage device having computer readable program code stored thereon, wherein the computer readable program code, when executed by a processor of a first computer, causes the processor to:
- display a login page on a display screen of a first computer;
- receive a first user ID and a first password associated with a first user via the displayed login page;
- send a first authentication request for the first user ID and the first password;
- in response to successful authentication of the first user ID and the first password, display an additional login page on the display screen of the first computer;
- receive a second user ID, that differs from the first user ID, and a second password associated with a second user via the displayed additional login page;
- send a second authentication request for the second user ID and the second password without logging out the first user;
- in response to successful authentication of the second user ID and the second password, send to a second computer having access to a database table, while the first user and the second user are simultaneously logged in via the first computer, a search request for first data from the database table that the first user is authorized to access and second data from the database table that the second user is authorized to access;
- receive the requested first and second data in the database table after sending the search request; and
- display, in a user interface on the display screen of the first computer, the first data that the first user is authorized to access and the second data that the second user is authorized to access.

9. The computer program product of claim 8, wherein the received first and second data comprises individual data and family data, wherein the individual data comprises a first set of rows of the table that the first user is authorized to access and a second set of rows of the table that the second user is authorized to access, wherein the family data is (i) a sum set consisting of a combination of the first set of rows and the second set of rows or (ii) a product set consisting of a combination of the rows that both the first set of rows and the second set of rows comprise.

10. The computer program product of claim 9, wherein the computer readable program code is configured to cause the processor to display the first data and the second data on the display screen of the first computer as the sum set.

11. The computer program product of claim 9, wherein the computer readable program code is configured to cause the processor to display the first data and the second data on the display screen of the first computer as the product set.

12. The computer program product of claim 8, wherein the computer readable program code is configured to cause the processor to:
- receive a first cookie having a first cookie value associated with the first user ID in response to successful authentication of the first user ID and the first password; and
- receive a second cookie having a second cookie value associated with the first user ID and the second user ID in response to successful authentication of the second user ID and the second password.

13. The computer program product of claim 8, wherein the computer readable program code is configured to cause the processor to:
- send the first cookie having the first cookie value with the second authentication request; and
- send the second cookie having the second cookie value with the search request.

14. The computer program product of claim 8, wherein the first data includes data not included in the second data; and
wherein the second data includes data not included in the first data.

15. A computer system comprising:
a display screen;
a network interface; and
a processor communicatively coupled to the display screen and the network interface, wherein the processor is configured to:
output signals to the display screen to display a login page;
receive a first user ID and a first password associated with a first user via the displayed login page;
send, via the network interface, a first authentication request for the first user ID and the first password;
in response to successful authentication of the first user ID and the first password, output signals to the display screen to display an additional login page;
receive a second user ID, that differs from the first user ID, and a second password associated with a second user via the displayed additional login page;
send, via the network interface, a second authentication request for the second user ID and the second password without logging out the first user;
in response to successful authentication of the second user ID and the second password, send, via the network interface, to a second computer having access to a database table, while the first user and the second user are simultaneously logged in via the first computer, a search request for first data from the database table that the first user is authorized to access and second data from the database table that the second user is authorized to access;
receive the requested first and second data in the database table after sending the search request; and
output signals to the display screen to display, in a user interface on the display screen, the first data that the first user is authorized to access and the second data that the second user is authorized to access.

16. The computer system of claim 15, wherein the received first and second data comprises individual data and family data, wherein the individual data comprises a first set of rows of the table that the first user is authorized to access and a second set of rows of the table that the second user is authorized to access, wherein the family data is (i) a sum set consisting of a combination of the first set of rows and the second set of rows or (ii) a product set consisting of a combination of the rows that both the first set of rows and the second set of rows comprise.

17. The computer system of claim 16, wherein the processor is configured to output signals to the display screen to display the first data and the second data as the sum set.

18. The computer system of claim 15, wherein the processor is further configured to:
receive a first cookie having a first cookie value associated with the first user ID in response to successful authentication of the first user ID and the first password; and
receive a second cookie having a second cookie value associated with the first user ID and the second user ID in response to successful authentication of the second user ID and the second password.

19. The computer system of claim 18, wherein the processor is further configured to:

send the first cookie having the first cookie value with the second authentication request; and send the second cookie having the second cookie value with the search request.

20. The computer system of claim 15, wherein the first data includes data not included in the second data; and wherein the second data includes data not included in the first data.

\* \* \* \* \*